(12) United States Patent
Proulx et al.

(10) Patent No.: US 8,667,056 B1
(45) Date of Patent: Mar. 4, 2014

(54) DYNAMIC TRAFFIC MANAGEMENT

(75) Inventors: Dylan Proulx, Seattle, WA (US);
Manasi Manasi, Seattle, WA (US);
Allen Butler, Seattle, WA (US); Pratik P. Shah, Mercer Island, WA (US);
Christopher J. Wahlen, Seattle, WA (US); Nicole H. Dolan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 121 days.

(21) Appl. No.: 13/172,675

(22) Filed: Jun. 29, 2011

(51) Int. Cl.
*G06F 15/16* (2006.01)

(52) U.S. Cl.
USPC ........... 709/203; 709/205; 709/225; 709/226; 709/229; 370/235; 370/237; 370/229

(58) Field of Classification Search
USPC ........................................................ 709/226
See application file for complete search history.

(56) References Cited

U.S. PATENT DOCUMENTS

| | | | |
|---|---|---|---|
| 6,016,503 A * | 1/2000 | Overby et al. | 718/104 |
| 6,789,203 B1 * | 9/2004 | Belissent | 726/22 |
| 8,103,769 B1 * | 1/2012 | Weiser et al. | 709/225 |
| 8,190,593 B1 * | 5/2012 | Dean | 707/707 |
| 8,203,941 B2 * | 6/2012 | Johnson et al. | 370/230 |
| 8,234,302 B1 * | 7/2012 | Goodwin et al. | 707/783 |
| 2005/0198099 A1 * | 9/2005 | Motsinger et al. | 709/200 |
| 2007/0118653 A1 * | 5/2007 | Bindal | 709/226 |
| 2008/0263632 A1 * | 10/2008 | Keon | 726/3 |
| 2008/0291934 A1 * | 11/2008 | Christenson et al. | 370/412 |
| 2009/0125632 A1 * | 5/2009 | Purpura | 709/229 |
| 2009/0265458 A1 * | 10/2009 | Baker et al. | 709/224 |
| 2010/0082838 A1 * | 4/2010 | Wang et al. | 709/233 |
| 2010/0131668 A1 * | 5/2010 | Kamath et al. | 709/233 |
| 2011/0153724 A1 * | 6/2011 | Raja et al. | 709/203 |

* cited by examiner

*Primary Examiner* — Thanh Tammy Nguyen
*Assistant Examiner* — Natisha Cox
(74) *Attorney, Agent, or Firm* — Kilpatrick, Townsend & Stockton, LLP

(57) ABSTRACT

Requests from multiple users for one or more shared resources can be dynamically throttled based on at least one allowance value determined for each user at a current point in time. One or more business functions or other such algorithms can be used to determine an appropriate allowance value for a user based on any of a number of appropriate factors, such as the cost of a resource, a value of the user, a request volume of the user, or other such factors. The values for each user can be fed into one or more algorithms to determine information such as request limits, burst limits, and costs per request. Such approaches provide for dynamic and fine-grained traffic shaping while allowing for variance of these limits or values over time.

24 Claims, 6 Drawing Sheets

DYNAMIC TRAFFIC MANAGEMENT

BACKGROUND

In provider networks and other electronic environments, it is common for multiple users to send requests to a common resource, such as a host machine or server that is operable to process the request and perform at least one associated action. As the number of users and requests increases, the number of resources needed to handle those requests increases as well. The cost of purchasing and maintaining these resources can limit the amount of resources made available, such that there generally is a maximum number of requests that can be handled at any given time, even when the requests are distributed across multiple instances of a given type of resource. Exceeding a maximum number or rate of allowable requests can negatively impact the quality of service that users receive, as the average response time for requests might increase dramatically, requests might time out, or the system might crash or experience other problems.

One conventional solution to this problem is to limit the number of requests from a given requestor over a given period of time, commonly referred to as throttling. In some conventional approaches, a group or type of user is given a hard limit for resource requests for a particular type of resource over a period of time. There might be more than one group or type of user that each receives a different limit, such as may be based upon the price paid by that type of user. While such an approach may be effective in some situations, it can be too limiting in other situations. For example, such an approach may work well in an environment with a single host having a fixed amount of capacity, but may not be optimal in situations where resources are provided in a dynamic and distributed fashion, where the amount of available resource capacity can change over time. Further, other aspects such as the effective cost of processing a request can vary over time as well. Hard limits or fixed throttling caps do not provide any flexibility to adapt to these changing conditions.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to managing traffic, such as requests for resources in an electronic environment. In particular, various approaches discussed herein provide for dynamic throttling of requests, messages, or other such access to, or use of, resources that can be provided in a distributed environment. This dynamic throttling of requests, or "shaping" of traffic flow, can be provided by utilizing one or more resource appropriate curves or functions that are able to adapt to changing conditions across the network. In at least some embodiments, one such function can enable each customer (e.g., an individual user, entity, organization, etc.) to receive a portion of the resource capacity that is proportional to some type of value provided by that user to a provider of the resource. Such functions also can be used to determine factors such as rates of utilization for various customers, which can be used to determine an allowed amount of access to a resource to provide to a user for at least a given period of time. Such an approach enables throttling or traffic shaping approaches to adjust dynamically to various conditions and provide a much more fine-grained approach than for hard limits or step function-based throttling limits. Further, each type of resource can have one or more specific curves that can be used to shape traffic as appropriate for that particular resource. A user can be charged as appropriate for the type of resource accessed, the rate or volume of requests over a given period, and/or other such aspects.

Figure 1:
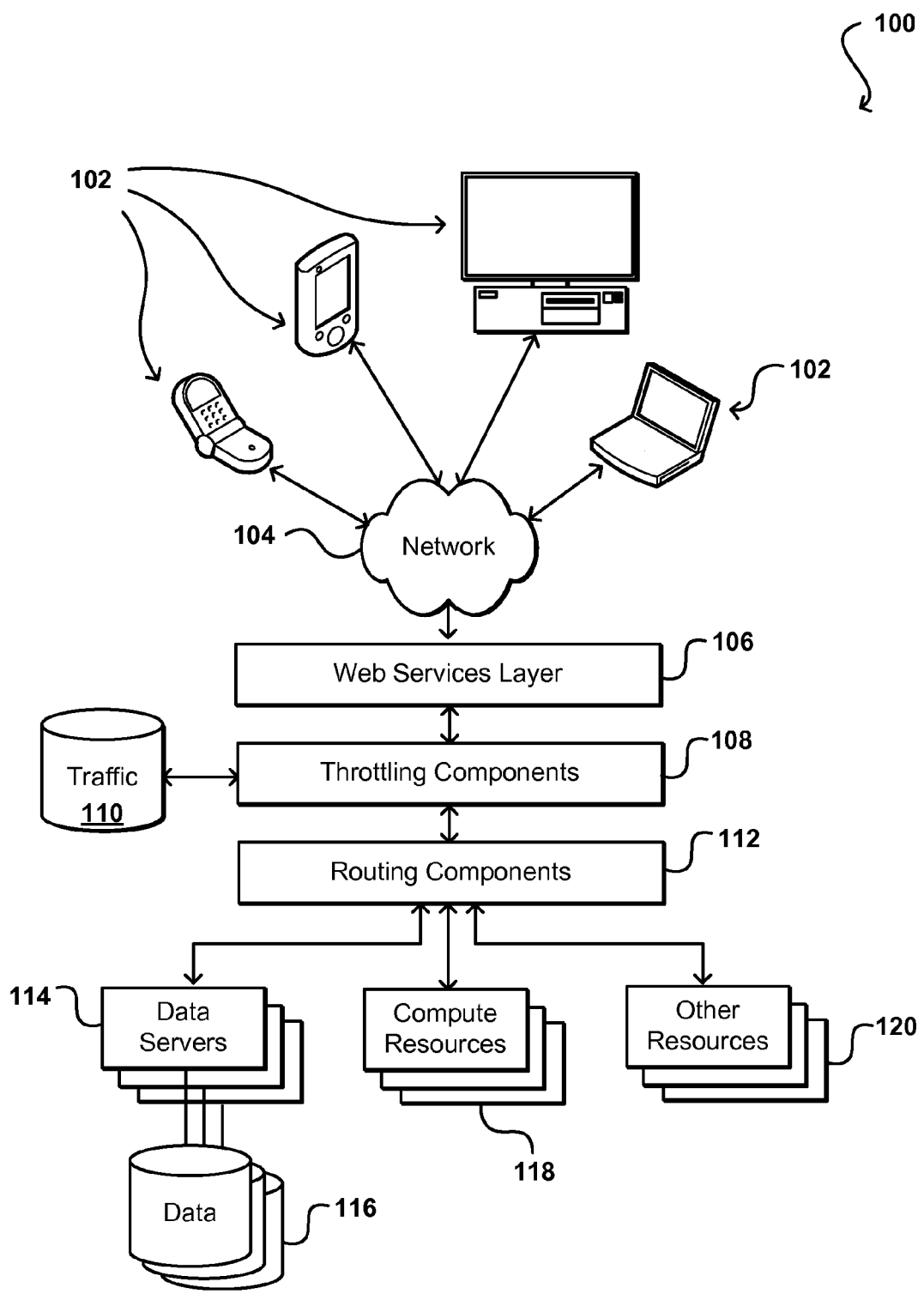
FIG. 1 illustrates an example environment in which various embodiments can be implemented.

FIG. 1 illustrates an example environment 100 in which user requests and/or network traffic can be shaped in accordance with various embodiments. As will be appreciated, although a Web-based environment is used for purposes of explanation, different environments may be used, as appropriate, to implement various embodiments. The system enables one or more appropriate electronic client or computing devices 102 to submit requests across at least one network 104, such as the Internet. The client devices can include any appropriate device operable to send and receive requests, messages or information over an appropriate network and convey information back to a user of the device. Examples of such client devices include personal computers, smart phones, tablet computers, handheld messaging devices, laptop computers, set-top boxes, personal data assistants, electronic book readers, portable gaming systems, and the like. The network 104 can include any appropriate network, including an intranet, the Internet, a cellular network, a local area network, or any other such network or combination thereof. Components used for such a system can depend at least in part upon the type of network and/or environment selected, and various protocols and components used for communicating via such a network are well known and will not be discussed herein in detail. Communication over the network can be enabled via wired or wireless connections and/or combinations thereof. In this example, the network includes the Internet, as the environment includes a Web services layer 106 for receiving Web service requests and serving content in response thereto, although for other networks, an alternative layer or set of devices or components serving a similar purpose could be used, as would be apparent to one of ordinary skill in the art.

The Web services layer 106 can include any appropriate components known or used for receiving and managing Web service requests. These can include, for example, one or more Application Programming Interfaces (APIs), at least one Web server, firewall or security components, etc. When a request is received by the Web services layer (or another appropriate set of hardware and/or software components), the Web services layer can determine various information about the request, such as a type of request and a user, customer, or entity associated with the request, and can determine whether to process the request based at least in part upon permissions, security policies, access agreements, and other such information. In this example, a component of the Web services layer 106 might determine that the request relates to at least one resource offered by an associated provider. The resource can be any appropriate device, system, or component operable to receive a request and perform an operation in response thereto. For example, a resource might be a data server 114 operable to read, write, or process data in or from one or more data stores 116. In some embodiments, a resource might comprise one or more compute resources 118, such as may comprise a host machine or application server operable to perform a specified operation in response to a request. Any other appropriate resource 120 can be provided as well, such as a resource that locates, provides, or renders content, etc. The resources can be dedicated or multi-tenant resources, where access may be shared among one more users according to one or more policies or rules. Further, the requests for a user might be allocated across multiple instances of a single type of resource.

When the Web services layer determines that the request is a valid request relating to an associated resource, a component of the Web services layer 106 can provide the request to one or more throttling components 108. The throttling components can include any appropriate device, system, module, or process, implemented in hardware and/or software for managing customer traffic. In some embodiments, this involves placing information for the request in a work queue that is monitored by the throttling components. When a request is received by the throttling components 108, the components can consult information related to the request, such as a type of resource targeted by the request and a user associated with the request, as may be stored in at least one data store 110 or other such location. As used herein, the term "data store" refers to any device or combination of devices capable of storing, accessing and retrieving data, which may include any combination and number of data servers, databases, data storage devices and data storage media, in any standard, distributed or clustered environment. Based at least in part upon this information, the throttling components can determine whether to allow or deny the request. If the request is denied, a denial message or other such information can be returned and/or displayed to the user as appropriate. If the request is allowed for processing, information for the request can be passed to one or more routing components 112, as known or used in the art for routing traffic, to direct the request to an appropriate resource. As discussed, the resources might be distributed logically and/or geographically, and the network routing can ensure that the request is directed to an appropriate instance, address, or location, etc. It should be understood that there can be several servers, layers, or other elements, processes, or components, which may be chained or otherwise configured, that can interact to perform tasks such as obtaining data from an appropriate data store or causing an operation to be performed. Each server or host device in the system typically will include an operating system that provides executable program instructions for the general administration and operation of that server or device, and typically will include at least one non-transitory computer-readable storage medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Further, traffic management could be offered as a service for third party providers whereby at least some of the resources are provided by a third party, and the requests from the user are received (or intercepted) by the throttling service and then denied or passed along to the third party for processing. Thus, the depiction of the system 100 in FIG. 1 should be taken as being illustrative in nature and not limiting to the scope of the disclosure.

As discussed above, for each type of resource there can be a maximum amount of capacity available at any given time, even though this amount might vary over time, such as where additional servers or host machines are added to, or removed from, the respective portion of the network. Traditional throttling approaches that place fixed limits on resources or numbers of requests do not adapt well to these dynamic changes, and can result in resources being underutilized, users being unnecessarily limited, or other such situations.

Approaches in accordance with various embodiments address at least some of these and other situations by utilizing one or more resource allocation or traffic shaping curves or functions, which can be selected and/or adapted to various situations. For example, different types of resource might have different curves used for access control, or can utilize different scaling factors or other such values that can affect the shape or results of a given curve.

Figure 2:
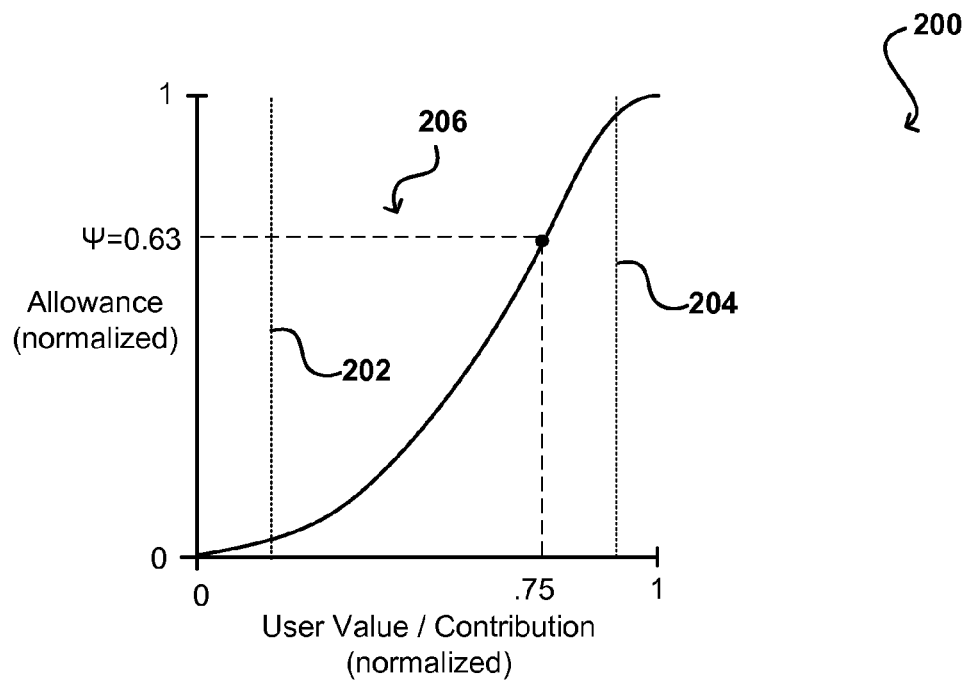
FIG. 2 illustrates an example function that can be used to determine an allowance factor for one or more users in accordance with one embodiment.

FIG. 2 illustrates an example curve 200, as may correspond to an appropriate business function, wherein customers can be granted an amount of access to a given type of resource based at least in part upon the amount that the customer pays per request, per period of time, etc. In this example, the possible values are normalized to run from 0 to 1 along both axes (thus being unitless). The minimum amount a user can pay is set to 0 (although the amount the user pays may be nothing or might be a minimum, non-zero amount set for that resource). Similarly, the maximum amount a user might pay (which might change dynamically based on an actual maximum amount at the current time) can be set to 1, with all values in-between being scaled appropriately. Similarly, the amount of access can be scaled from 0 to 1 as well, with 0 being set as a minimum amount of allowed access (which will be some non-zero value in many embodiments, such as one request every ten seconds) and 1 being set to a maximum amount of allowed access, as may be granted to the user paying the highest rate per request, etc. As can be seen, this particular function can provide limits that are relatively fixed at each end, such as that users paying under a certain amount 202 will generally receive similar service allocations, and users paying over a certain amount 204 will also receive similar service allocations. Users paying some amount in-between can receive a level of service or access that is more directly correlated and/or appropriate for the amount that is being paid. For example, large users might pay a fixed amount for the maximum level of access, and small users might pay a small fee to obtain at least some level of access. There can be varying levels in-between, and a curve such that that utilized provides much more granularity than a fixed limit or step function, as a user or customer can pay for exactly how much access that customer wants at the current time. Further, the normalization of the curve enables that curve to be used as the amount of available capacity changes, as the values (cost and/or amount of access) correlated to the 0 and 1 values of the curve can update as appropriate. For example, if a customer is paying 0.75 of the amount between the highest and lowest customer, then that customer might receive a value such as 0.63 of the amount of available resources regardless of the amount of available resources at any given time (illustrated by 206). Similarly, if the customer wants an fixed or specific amount of access to that resource, the amount that the customer is charged for that access can be determined from this curve based at least in part upon the amount of available resources or other such factors.

Figure 3:
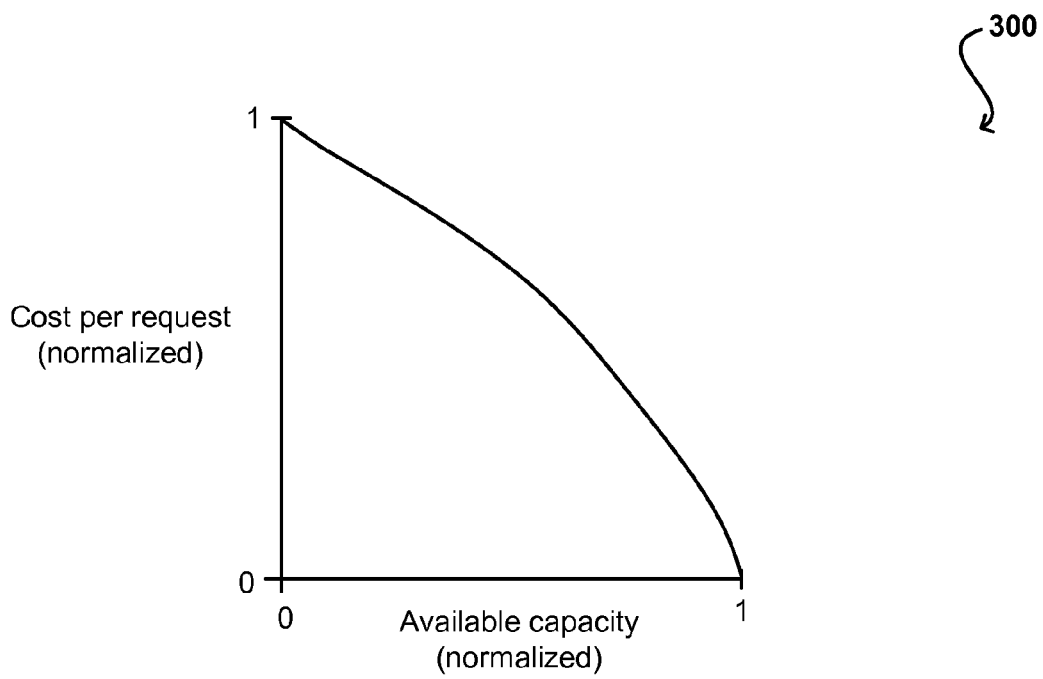
FIG. 3 illustrates an example function that can be used to determine a current request pricing value in accordance with one embodiment.

FIG. 3 illustrates another example curve 300 for adjusting pricing values that can be used, for example, to determine allowance values such as is discussed above with respect to FIG. 2. A curve such as that illustrated in FIG. 3 can be used to set the pricing for various requests based upon one or more factors, as may include a current or total available capacity for a type of resource, which thus can affect a user allowance or other such value. Again, the curve can be normalized to run from 0 to 1 in at least some embodiments, as may be based on a minimum and maximum amount of capacity or other such value. In this example, the amount charged for a determined amount of access to a particular type of resource can be determined based at least in part upon the available or maximum capacity for a type of resource at a current point in time. Various other factors can be considered in the curve as well, such as a number or rate of user requests, number of users, average load, etc. and various other approaches can be utilized as well within the scope of the various embodiments. Similarly, the current rate of requests or amount of usage might be utilized instead of the available capacity, where the cost per request might decrease as the total number of requests increases. Thus, in one example, a provider of a data warehouse might be able to run a query to determine a current pricing value based on a current amount of usage as determined by the appropriate pricing curve(s).

In some embodiments, a curve such as that illustrated in FIG. 3 might be applied to individual customers as well. Such an approach would enable individual customers to obtain a cost per request that is determined based upon an amount of capacity that is dedicated to that customer. In this way, customers purchasing a large amount of capacity (whether dedicated, reserved, etc.) might pay less on a per-request basis than a customer who submits only a small number of requests with no minimum allocated capacity. Such an approach effectively enables certain customers to obtain a "dynamic volume discount" based at least in part upon a current rate of usage of not only all customers, but the individual customer itself.

Figure 4:
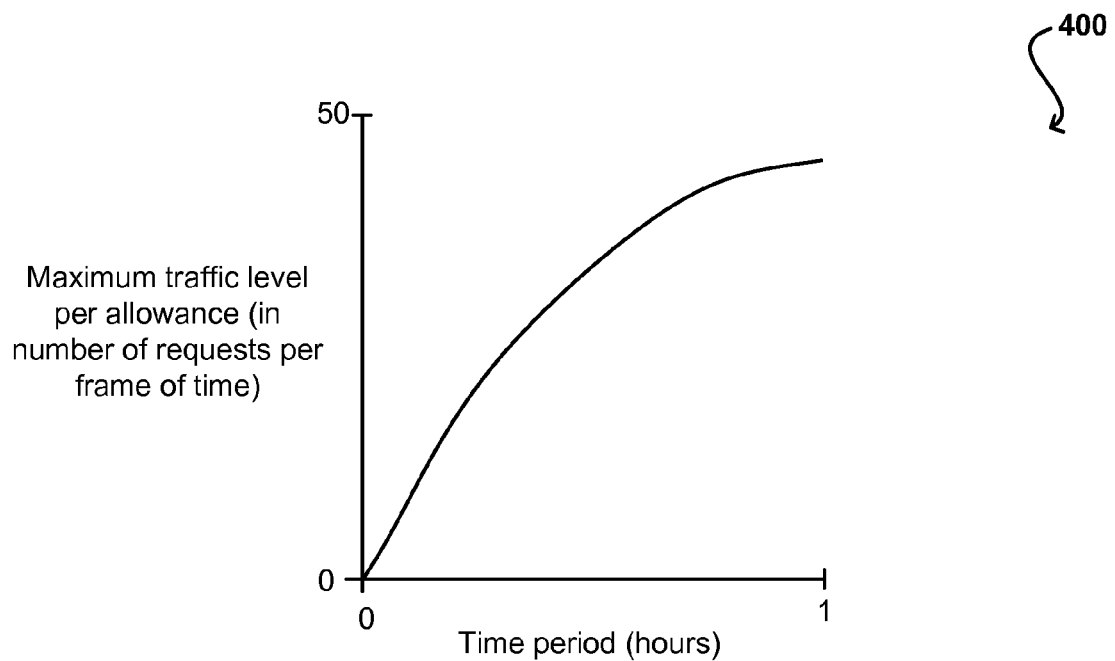
FIG. 4 illustrates an example function that can be used to determine an allowable or limited rate of requests that can be obtained by a user in accordance with one embodiment.

As discussed above, such curves can be used to control access to a resource or otherwise shape network traffic. For example, FIG. 4 illustrates an example of a curve 400 that can be used to determine an amount of access to give to a customer under current conditions. Again, the curve can be normalized to run from 0 to 1 in at least some embodiments. An appropriate business function can be selected that can address the fact that the supply (e.g., availability) and demand (e.g., number of requests) for a given type of resource can change over periods of time and over different types of resource.

An example of one such business function (here, a sigmoid function) as illustrated by the plot of FIG. 4 is given by:

$$T_\psi = Se^{-7e^{-7\psi}}$$

where $\psi$ is defined as the allowance of a resource, the evaluation of a function that has a range of [0,1], which can be based upon factors such as the cost of a resource at the current time and/or inputs based on the source or type of request, etc. Further, S is a scaling factor that can be selected based at least in part upon the current type of resource for which traffic is being shaped, and T is the maximum traffic level for a particular allowance. The implication is that, for given values of the normalized domain and range:

$$T(0) = T_{MIN}$$

and $$T(1,0) = T_{MAX}.$$

Thus, if the request rate exceeds T, requests to that resource might be denied as a result of the resource being determined to be unavailable for that request.

Such a function models an availability of a population whose distribution is skewed to the right, although other such curves can be used for similar modeling and/or other population characteristics can be considered when selecting a model. In the example business function above, the function provides simple scaling of the traffic shape by influencing or adjusting the scaling factor S, which might have a lower value for scarce resources and a higher value for resources that are abundant. The function itself models systematic exponential, yet bounded, growth. The derivative of this particular function is a distribution curve that is skewed to the right, and the majority of the population is between 0.10 and 0.50. It should be understood, however, that other curve(s) can be used as well as appropriate, such as a linear function $T = S\psi$.

In at least some embodiments, such a curve can be used to determine when to throttle requests for a specific type of resource. In order to determine when requests for the resource should be throttled, the curve in at least some embodiments can be consulted for a particular "frame" or determined period of time. A frame can correspond to a rolling or sliding window of time that, when summed, equals a single unit of time for which $T\psi$ is defined. There can be multiple levels of frames used in various embodiments to detect events such as bursting, where a user might be within a given allowance but utilizing that allowance over a very short period of time, which can potentially cause problems for the system if, for example, all users try to use their hourly allowance in the first 30 seconds of an hour. Thus, it can be important, or at least useful, in at least some embodiments to also look to a rate or velocity of requests over a period of time.

In at least some embodiments, a "velocity" of requests can be incremented when a number n of requests are made for a resource at time t, as may be based on the time of the previous request. A set allowance value can be compared to the current velocity value, and if the velocity exceeds the allowance then one or more requests can be denied. In certain embodiments, the velocity might only be increased if the request is accepted. An example of a velocity calculation function is given by:

$$V_n = \max\left(0, V_{n-1} + \frac{r}{\Delta t} - \partial(\Delta t)\right)$$

In this example, r is the number of requests in the current time frame, and $\Delta t$ is the time difference from the last time where r>0. Access to the resource can be denied if $V_n$ is ever greater than $T\psi$ for the current frame. In at least some embodiments, the velocity determination can have a built-in decay value, such that the velocity will tend to zero when there are no new requests over a period of time. The speed at which the decay occurs is based on $\partial$, which is dependent on the resource being controlled.

In at least some embodiments, however, velocity alone will not be sufficient to maintain a constant stream of requests that approaches $T\psi$. For example, if the frame is a 60 minute period, then V could equal $T\psi$ within the first few minutes. To account for this, a maximum burst rate can be calculated to account for, and allow an amount of, bursting of a resource relative to $\psi$. In one embodiment, the maximum burst rate M can be defined by:

$$M = \frac{T\psi}{\Delta t}$$

In order to prevent the velocity for a particular frame of time from exceeding M, the current velocity can be combined with the acceleration for a particular frame. For example, the velocity might still be within an acceptable range, but if it can be determined that the velocity is increasing at a particular rate, then a predicted velocity $V_p$ can be used to determine when to prevent a user from exceeding the maximum burst rate. In at least one embodiment, any requests that are submitted when that would put the user over the resulting burst rate can be throttled, such that the predicted velocity is maintained at or below the maximum burst rate, as given by:

$$V_p \leq M$$

The predicted velocity in at least some embodiments can be given by:

$$V_p = A_{\Delta t} + V_n, \text{ where}$$
$$A_{\Delta t} = \frac{(v_n - V_{n-1})}{\Delta t}.$$

In this equation, the acceleration A over a period of time being analyzed ($\Delta t$) is a measure of the amount of change between the current velocity $v_n$ and the previously measured velocity $v_{n-1}$ over that period of time. The acceleration can be combined with the current velocity to predict the velocity over a subsequent period of time. By being able to predict the velocity, requests can be throttled before a maximum burst rate M is exceeded.

In at least some embodiments, a maximum burst rate or other such factor can be adjusted based at least in part upon certain conditions. For example, a maximum burst rate and/or length of a sliding window can be adjusted dynamically based upon changes in the load on a type of resource. If a user is able to submit up to 500 requests per hour, then at peak load the user might be able to submit up to 15 requests per minute as a maximum burst rate. At times of lesser load, there might be no burst rate applied (assuming 500 relatively simultaneous requests would not cause problems in the network) or there might be a different time period applied, such as where a user can submit up to 200 requests in any five or ten minute period. In some embodiments there might even be multiple frames, such as where a user has an allowance of 500 requests per hour, but can submit up to 15 in any one-minute time period and up to 100 in any ten minute period.

Figure 5:
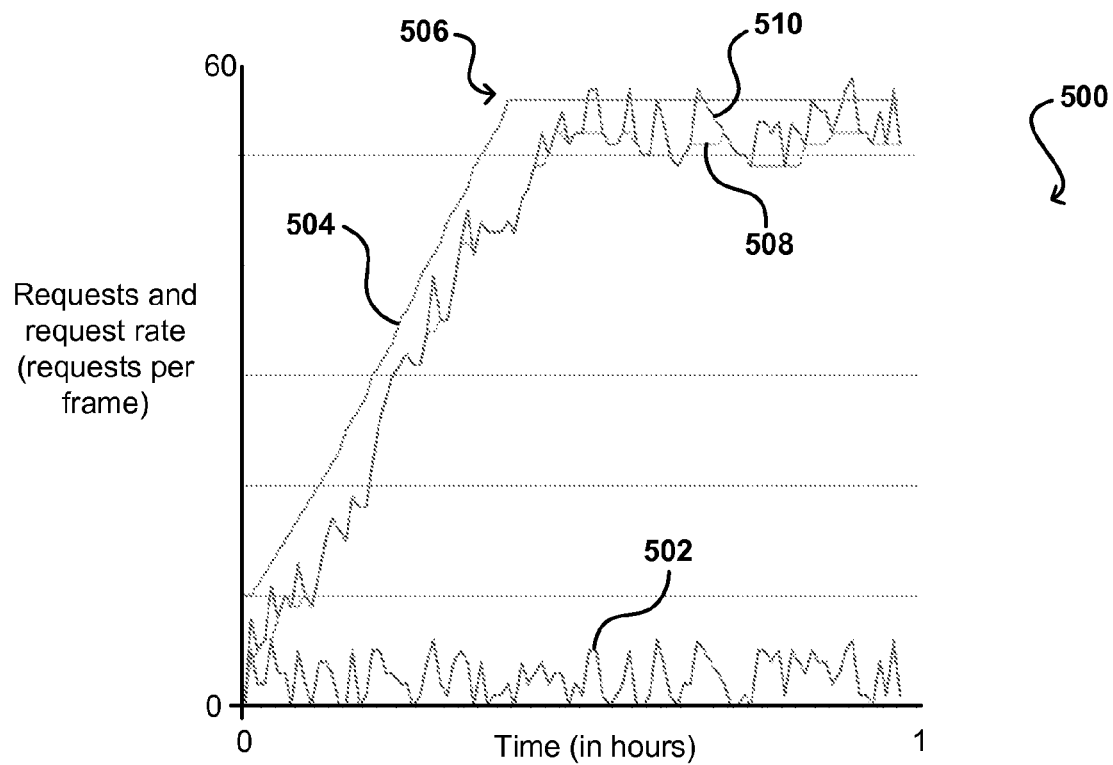
FIG. 5 illustrates a graph showing an example rate of requests received from a user, along with a corresponding dynamic request limit, as well as received and predicted request velocity values, in accordance with one embodiment.

FIG. 5 illustrates an example graph 500 showing a request pattern for a user over a period of time. In this example, the number of requests submitted at each time is illustrated by a first curve 502. A second curve 504 illustrates the dynamic limit on the number or rate of requests the user can submit, based at least in part upon the velocity, acceleration, and other such factors, which can increase up to a maximum allowable rate (the flat part 506 at 55 requests per frame period). Based on the number of requests submitted at each time as represented by curve 502, the actual velocity of the user can be plotted as a third curve 508 that can be calculated using any of the velocity formulas discussed or suggested herein. Similarly, the rate of change in velocity can be used to determine a predicted velocity plotted as curve 510, which can also be calculated as discussed elsewhere herein. As can be seen, the predicted velocity can occasionally exceed the velocity limit due to bursts in the number of requests, but by monitoring the predicted velocity and performing any necessary throttling it can be seen that the actual velocity of requests can approach the limit but does not actually exceed the allowable velocity limit in this example.

Figure 6A:
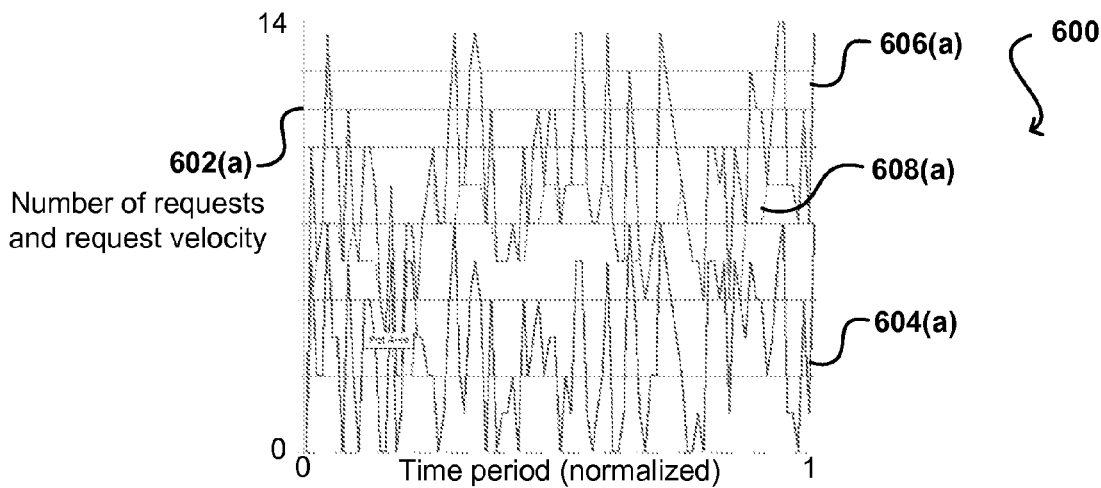
FIGS. 6(a), (b), and (c) illustrate graphs showing rates and limits for low, medium, and high value users, respectively, in accordance with one embodiment.
Figure 6B:
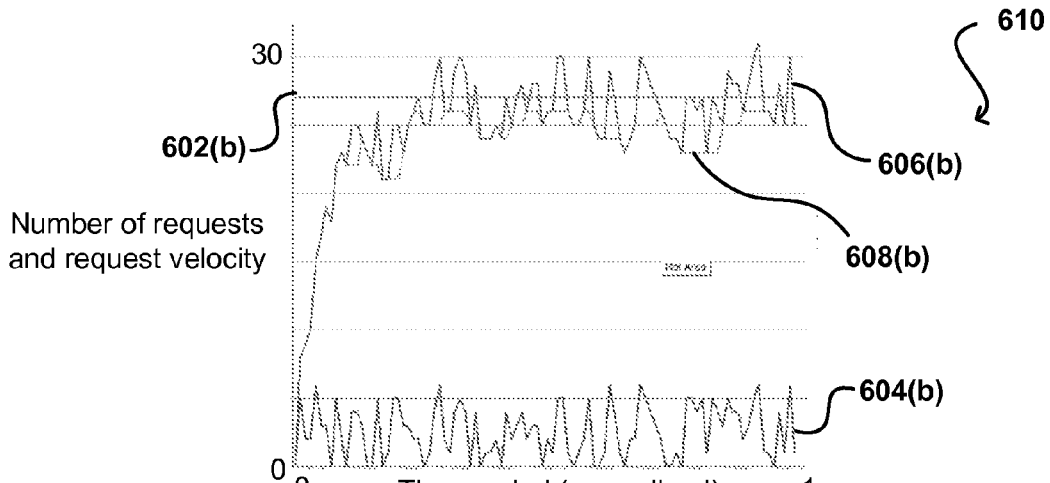
Figure 6C:
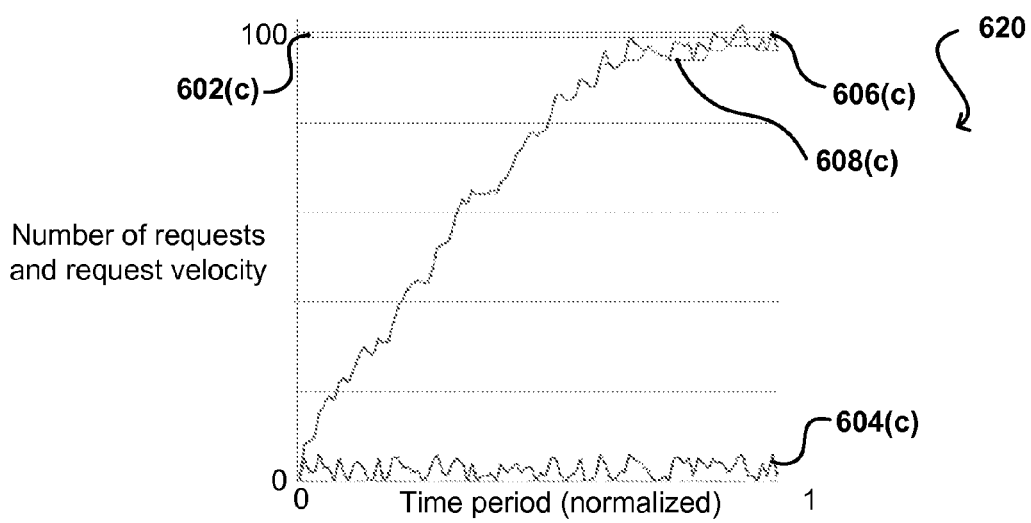

FIGS. 6(a)-6(c) illustrate plots for varying values of $\psi$, where a different request or access allowance for a resource is provided for different users. In FIG. 6(a), for example, the graph 600 shows a relatively low value of $\psi$ allocated to a low volume user, for example, where the limit curve 602(a) does not substantially change over time. The number of requests 604(a) is shown, along with the predicted 606(a) and actual velocity 608(a) of requests. FIG. 6(b) illustrates a similar graph 610 for a medium velocity user, with a different limit curve 602(a). The number of requests 604(b) is again shown, along with the predicted 606(b) and actual velocity 608(b) of requests. For the low limit user, the limit is fixed because the burst rate is either not determined or would be at least equal to the limit over time. For a higher volume user, the plot starts being skewed to the right, as there is also a limit on the acceleration of the number of requests as determined by the maximum burst rate. This is further illustrated in the graph 620 of FIG. 6(c), where there is yet a higher limit 602(c) on the allowance for that user. Again, the number of requests 604(c) is shown, along with the predicted 606(c) and actual velocity 608(c) of requests. Using the same formula (s), different allowances can be provided to different users that can still ensure that these users do not exceed their respective allowance limits. Further, the upper "tier" users can have more of a gradual increase than the lower tier users based at least in part upon the respective limits and allowable accelerations.

As mentioned, throttling decisions can be made at any appropriate time or location, which can vary depending at least in part upon the environment. In FIG. 1, for example, one or more components of the throttling layer can, upon receipt of a request for a resource, analyze the limit, velocity, and other such information for a customer associated with that request and determine whether to allow or deny that request, or perform another such action.

Figure 7:
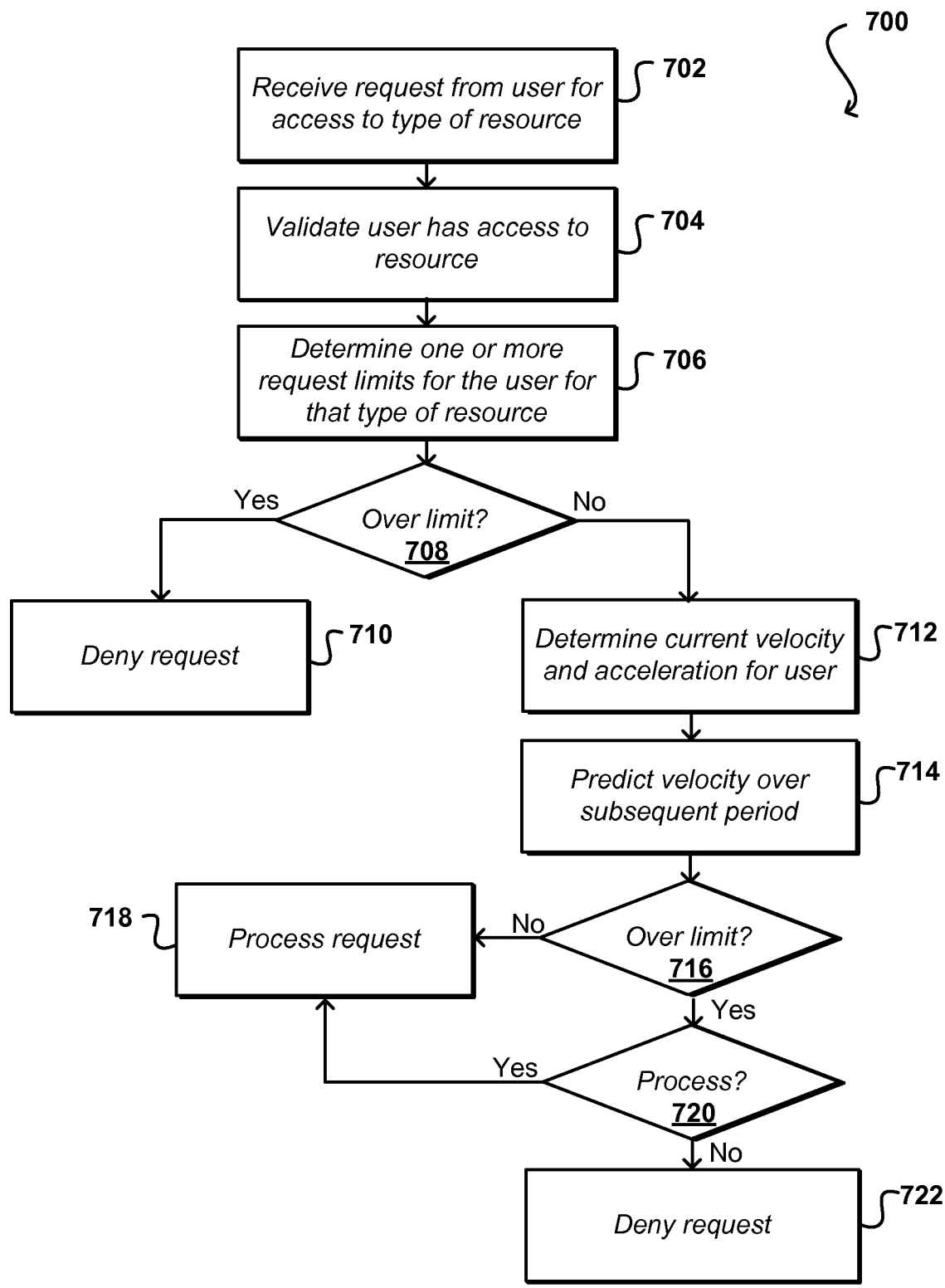
FIG. 7 illustrates an example process for managing traffic that can be used in accordance with at least one embodiment.

FIG. 7 illustrates an example process 700 for managing resource requests that can be used in accordance with various embodiments. It should be understood that, for any process discussed or suggested herein, there can be additional, fewer, or alternative steps, performed in similar or alternative orders, or in parallel, within the scope of the various embodiments unless otherwise stated. In this example, a request is received from a user that pertains to a particular type of resource 702. As discussed, this can include any appropriate type of request, such as a data request, hypertext transfer protocol (HTTP) request, or Web service request, for access to an appropriate resource, such as a data or computing resource. In at least some embodiments, a validation or authentication process will be executed to ensure that the user has access to the resource type associated with the request 704. For example, the user might have access to a data resource, but not a compute resource, or might only have access to a resource during certain time periods, etc. The access can be determined by one or more access policies or other such approaches as known or used in the art for such purposes. If the user does not have access, the request can be denied or otherwise handled at this point in the process.

If the user is determined to have access to the type of resource associated with the request, one or more request limits can be determined for the user 706. As discussed, the user might have an overall allowance limit on a number of requests over a given period of time, and might also have an associated burst limit for submitted requests. These limits can vary by user and/or type of resource, and further can vary over time as discussed elsewhere herein. A determination is made as to whether the user is over the allowed request limit for the current period 708. In some embodiments, the user might be associated with an entity or organization that might have a limit which might already have been exceeded by other users associated with that entity. In any of these cases, the request can be denied 710 when the user is over a respective limit. If a decision is made not to process the request, a response can be returned to the user indicating that the request was denied. In some embodiments this can take the form of a "service unavailable" or other such message. In other embodiments, a response can be sent that includes information indicating to the user that the request was denied for a particular reason, such as exceeding an agreed-upon amount of traffic. In other embodiments, the request might just be dropped, which can result in a "service not available" or other such error message on the respective client device utilized to submit the request.

If the user is not currently over one or more limits, a current velocity and rate of acceleration can be determined for the user 712. Using any appropriate formula discussed herein, the current velocity can be determined and compared against a most recent prior velocity to determine an acceleration and, finally, a predicted velocity over a subsequent period of time 714. Thus, a determination can be made as to not whether the user is currently over a limit, but if based on recent activity is likely to exceed that limit in the near future. A determination is made as to whether the predicted velocity is over the limit for that type of resource for that user 716, and if not then the request can be processed 718, such as by placing the request in a queue to be transmitted on to the target resource. If the predicted velocity is over the limit, a decision can be made as to whether to process the request 720. As mentioned, various embodiments or implementations can handle predicted overruns in different ways. In some embodiments, a user may not be throttled until the user actually exceeds the limit. In some embodiments, a user can be notified if the user is about to exceed a burst limit or other such threshold. In still other embodiments, one or more of the requests received during a current period can be throttled if it is determined that the user will likely exceed the allowable velocity in the upcoming period, based on the predicted velocity value. In some embodiments, a request will be denied until the predicted velocity falls back to within an allowable range. If the decision is made to process the request, the request can be processed 718. If not, the request can be denied 722 as discussed elsewhere herein. It should be understood that at least some of these decisions can be made in different orders or concurrently using similar or different components in various embodiments.

As discussed, such an approach enables requests for storage capacity, computing capacity, or other such resources to be managed at times of peak traffic or other such conditions. Approaches provided herein can dynamically adjust limits and/or allowances in real time based upon current conditions and other such aspects, such as the currently available resource capacity, number of users, etc. A traffic shaping algorithm as discussed herein can handle resource scaling and other such occurrences, and can provide a much finer level of granularity of allowances and limits than traditional fixed-limit approaches. One or more scaling factors can be determined for each user and/or type of resource, such that traffic for different types of users or resources can be managed most effectively while maintaining the scalability of the approach.

In one embodiment, a lightweight throttling component can be used to receive or intercept requests for access to one or more types of resource and determine whether or not to provide such access using a global overview of usage data. In another embodiment, a throttling service, such as a throttling Web service, can be provided that sits "on top of" another service or application, for example, and controls access thereto. That is, the throttling service may be functionally placed between a requester and the other service or application. Other such throttling components and mechanisms can be used as well as would be understood to one of ordinary skill in the art in light of the teachings and suggestions contained herein. Further, although the examples are described with respect to users or requestors requesting access, it should be understood that the requests can be received from any appropriate person, application, component, service, or other such source in a manual or automatic process, or combination thereof.

In one example, a throttling component parses or otherwise determines information from the request that can be used to determine whether or not to process the request, such as whether the source of the request is authorized, how many requests have been sent for a given session, an Internet protocol (IP) address of the request, etc. The throttling component can compare this information with information such as configuration and traffic data to decide, on a request-by-request basis, whether to allow access. If the data for the request results in a determination that the request should be processed, the request, or a portion thereof, can be passed to the appropriate Web service and processed, and the data can be returned to the user in an appropriate format, such as an extensible markup language (XML) document.

In some embodiments, the actual throttling can be performed by a daemon for each server in a group of managed servers capable of serving the request. In other embodiments, there may be a distributed set of daemons and/or similar components across the electronic network. As known in the art, a daemon is typically a computer program, module, or process that runs in the background on each server, rather than under the direct control of a user. In other embodiments, the throttling can be performed by an appropriate service, process, etc. After a decision is made, information for the request can be propagated to other servers in the managed group, such that each server knows the global state of the system. Thus, a requestor can at any time send a request to one of the servers, and that server will be able to know when that requestor last made a request and/or other such information. Regardless of whether a given request is processed or denied, information about the receiving of the request can be stored locally by the throttling component. At an appropriate time, the data can be pulled or pushed to the other throttling daemons such that the global usage data is known to each instance of the throttling daemon across a server or resource group, etc.

Figure 8:
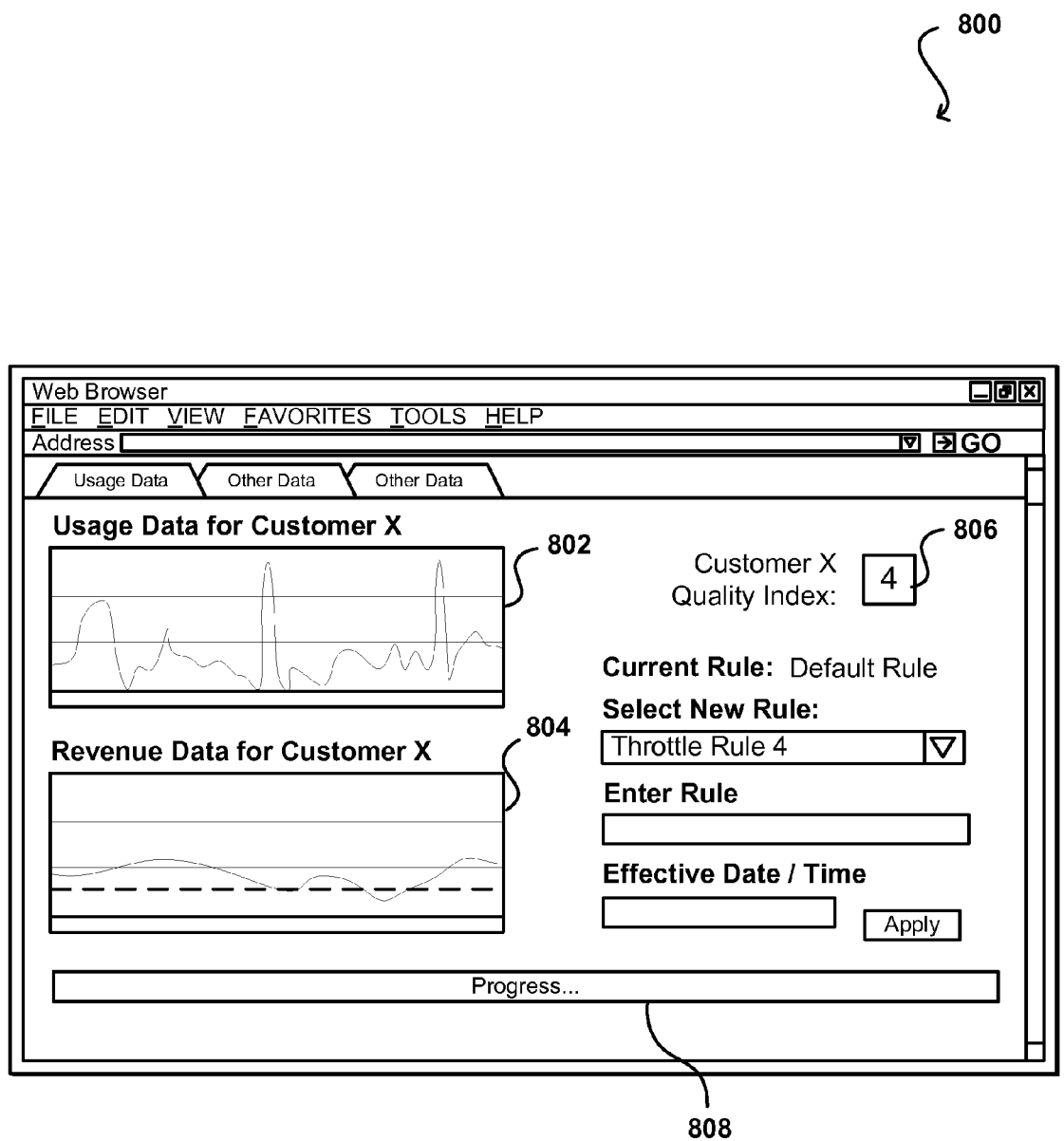
FIG. 8 illustrates an example interface that can be used in accordance with one embodiment.

FIG. 8 illustrates an example of a user interface page 800 that can be used in accordance with one embodiment to monitor and/or manage traffic for a user. In this example the page is a Web page viewable through a browser or similar application, but it should be understood that the page can be a page of a standalone application, etc. Once a rule, policy, business function, and/or allowance value is selected and/or determined for a requestor, a provider might want to view the usage of the requestor and determine whether the traffic management approach is adequate and/or working properly. In other embodiments, it might be desirable to monitor usage of requestors who are not being throttled, in order to determine which requestors should be throttled and at what time. The provider can also monitor the revenue generated from that requestor, in order to determine if the pricing algorithm is working as expected. In this example, the interface can display a recent period of traffic or usage information 802 as well as recent revenue 804, as illustrated in the figure. While rules, policies, or business functions can be used automatically determine when to throttle a requestor, a provider might wish to view the history for a requestor to determine when to apply a new rule, adjust a limit, add more resource capacity, etc. A requestor might generate a large number of requests, but if the corresponding revenue is above a certain level, the user might decide not to apply a restrictive rule, or might adjust a business function or factor such that the high revenue requestor is not throttled (at least below a certain, higher threshold). In some instances, a quality index 806, tier value, or similar requestor rating can be determined and/or used to determine which rule or function to apply for throttling purposes, or to indicate the type of information used for that requestor to determine an appropriate allowance value. A user of this interface can apply a rule or function to a user by selecting a rule, typing in a rule request with desired parameters, etc. A user also can select an effective date for the rule change as desired. A progress bar 808 or other indicator can be used to show the progress of the application of the rule, such as how many of the hosts have received and applied the rule. As the number of hosts applying the rule increases, the amount by which a user exceeds a desired amount should decrease, where appropriate.

In one embodiment, a provider is notified when a requestor exceeds a certain amount of traffic, or meets some other criterion. The provider can pull up a usage data page for that requestor, and determine whether the requestor is doing something out of the ordinary, using substantially real-time data. The provider also can view throttling data to see how often that requestor is throttled due to exceeding the appropriate number of requests, etc.

As discussed above, the various embodiments can be implemented in a wide variety of operating and/or electronic environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of dynamically determining whether to allow a request for a type of resource in a distributed electronic environment, comprising:
    under control of one or more computing systems configured with executable instructions, receiving a request associated with a plurality of users and a type of resource;
    determining whether a user has permission to access the type of resource, the user being a particular user of the plurality of users;
    determining a number of requests received for the user for the type of resource over a current period of time;
    denying the request when the user does not have permission to access the type of resource or the number of requests exceeds an allowed number of requests for the current period of time, the allowed number of requests determined dynamically for the current period of time according to one or more conditions;
    predicting a future velocity of requests received for the user based at least in part upon a current velocity of requests received for the user and an acceleration in the current velocity of requests received for the user over a recent period of time, the acceleration determined dynamically based at least in part on a maximum burst rate;
    denying the request when the current velocity or the future velocity exceeds a current allowed rate of requests, the current allowed rate of requests determined dynamically according to at least one continuous access function having a scaling factor selected for the type of resource and a maximum traffic level for an allowance value of the user, the scaling factor varying over time based at least in part upon a change in available capacity of the type of resource; and
    allowing the request for the type of resource when the user has access to the type of resource, the user is at or below the allowed number of requests for the current period of time, and the current and future velocities are at or below the current allowed rate of requests.

2. The computer-implemented method of claim 1, further comprising:
    determining the maximum burst rate for the user and the type of resource for the current period of time, the maximum burst rate being based at least in part upon the allowed number of requests over the current period of time; and
    denying the request if a rate of requests received for the user over the current period of time exceeds the maximum burst rate.

3. The computer-implemented method of claim 1, wherein the type of resource is a data server or an application server in a resource environment.

4. A computer-implemented method for managing traffic in an electronic environment, comprising:
    determining at least one continuous access function and at least one scaling factor for the at least one continuous access function for a type of resource available through the electronic environment, the scaling factor varying over time based at least in part upon a change in available capacity of the type of resource;
    receiving a request from a plurality of users relating to the type of resource;
    determining whether a user has permission to access to the type of resource, the user being a particular user of the plurality of users;
    determining a number of requests received for the user over a recent period of time; and
    allowing the request to be processed by an instance of the type of resource when the number of requests received from the user is at or below an allowed number of requests for the user over a given period of time, the rate of requests received from the user over the recent period of time does not exceed a maximum rate of requests for the user for the type of resource, and a predicted rate of requests for the user does not exceed the maximum rate of requests for the user for the type of resource, the predicted rate of requests determined dynamically based at least in part on a maximum burst rate and at least one of the allowed number of requests and maximum rate of requests being dynamically determined according to the continuous access function and the scaling factor selected for the type of resource and a maximum traffic level for an allowance value of the user.

5. The computer-implemented method of claim 4, further comprising:
    denying the request when the number of requests received from the user exceeds the allowed number of requests for the user, the rate of requests received from the user over the current period of time exceeds the maximum rate of requests for the user for the type of resource, or the predicted rate of requests for the user exceeds the maximum rate of requests for the user for the type of resource.

6. The computer-implemented method of claim 4, wherein the continuous access function is a sigmoid function, and wherein the scaling factor of the sigmoid function is determined dynamically for the type of resource based at least in part upon a current capacity of the type of resource.

7. The computer-implemented method of claim 4, wherein the continuous access function is given by:

$$T_\psi = S e^{-7 e^{-7\psi}}$$

where $\psi$ is the allowance of a resource, S is a scaling factor selected for the type of resource, and T is a maximum traffic level for a particular user allowance value.

8. The computer-implemented method of claim 7, wherein the scaling factor varies over time based at least in part upon a change in available capacity of the type of resource.

9. The computer-implemented method of claim 4, further comprising:
    determining the maximum burst rate for the user and the type of resource at a current point in time, the maximum burst rate being based at least in part upon the maximum traffic level for a determined allowance over the current period of time; and
    denying the request if a rate of requests received for the user over the current period of time exceeds the maximum burst rate.

10. The computer-implemented method of claim 4, wherein the rate of requests received from the user is determined by:

$$V_n = \max\left(0,\ V_{n-1} + \frac{r}{\Delta t} - \partial(\Delta t)\right),$$

where $V_n$ is a velocity over a current period, $V_{n-1}$ is a velocity over a prior period, r is a number of requests in a given time frame, and $\Delta t$ is a time difference from a last time when r>0.

11. The computer-implemented method of claim 4, further comprising:
    determining an allowance factor for the user according to a selected allowance function, the allowance function utilizing at least one measure of value provided by the user, the allowance factor being used to determine at least one of the allowed number of requests for the user over the given period of time and the allowed rate of requests.

12. The computer-implemented method of claim 4, further comprising:
    determining a price for the request to be charged to the user according to a business function utilizing at least a measure of current usage or capacity levels of the type of resource.

13. The computer-implemented method of claim 4, further comprising:
    determining at least one access policy for the user useful in determining whether the user has rights to access a type of resource when a request is received.

14. The computer-implemented method of claim 4, further comprising:
    determining a current load on one or more instances of the type of resource; and
    routing information for the request to at least one instance of the type of resource based at least in part upon the current load.

15. The computer-implemented method of claim 4, wherein the type of resource is provided by a third party, information for the request being passed to the third party when the request is allowed.

16. The computer-implemented method of claim 4, wherein a length of the current period of time is capable of varying over time according to one or more conditions.

17. A system for determining whether to allow access to a resource in an electronic environment, comprising:
    a device processor; and
    a memory device including instructions that, when executed by the device processor, cause the system to:
    determine at least one traffic shaping function and at least one scaling value for a type of resource available through the electronic environment, the scaling value varying over time based at least in part upon a change in available capacity of the type of resource;
    receive a request from a plurality of users relating to the type of resource;
    determining whether a user has permission to access to the type of resource, the user being a particular user of the plurality of users;
    determine a number of requests received for the user for a current period of time; and
    determine whether to allow the request based at least in part upon whether the number of requests received for the user is at or below an allowed number of requests for the user over the current period of time, whether the rate of requests received from the user over the current period of time exceeds a maximum rate of requests for the user for the type of resource, and whether a predicted rate of requests for the user exceeds the maximum rate of requests for the user for the type of resource, the predicated rate of requests determined dynamically based at least in part on a maximum burst rate and at least one of the allowed number of requests and maximum rate of requests being dynamically determined according to the traffic shaping function and scaling value selected for the type of resource and a maximum traffic level for an allowance value of the user.

18. The system of claim 17, wherein the instructions when executed further cause the system to:
    deny the request when the number of requests received from the user exceeds the allowed number of requests for the user over a given period of time, the rate of requests received from the user over the given period of time exceeds the maximum rate of requests for the user for the type of resource, or the predicted rate of requests for the user exceeds the maximum rate of requests for the user for the type of resource.

19. The system of claim 17, wherein the instructions when executed further cause the system to:
    determine the maximum burst rate for the user and the type of resource for the current period in time, the maximum burst rate being based at least in part upon the maximum traffic level for a determined allowance over the current period of time; and
    deny the request if the rate of requests received for the user over the current period of time exceeds the maximum burst rate.

20. A non-transitory computer-readable storage medium storing instructions for managing access to a shared resource, the instructions when executed by a processor causing the processor to:
    determine at least one continuous throttling function and at least one scaling factor value of the continuous throttling function for a type of shared resource, the scaling factor value varying over time based at least in part upon a change in available capacity of the type of shared resource;
    receive a request from a plurality of users for processing by the shared resource;
    determining whether a user has permission to access to the type of shared resource, the user being a particular user of the plurality of users;
    determine a number of requests received for the user over a recent period of time; and
    determine whether to allow the request based at least in part upon whether the number of requests received for the user is at or below an allowed number of requests for the user over the current period of time, whether the rate of requests received from the user over the current period of time exceeds a maximum rate of requests for the user for the type of shared resource, and whether a predicted rate of requests for the user exceeds the maximum rate of requests for the user for the type of shared resource, the predicted rate of requests determined dynamically based at least in part on a maximum burst rate and at least one of the allowed number of requests and maximum rate of requests being dynamically determined according to the traffic shaping function and scaling factor value selected for the type of shared resource and a maximum traffic level for an allowance value of the user.

21. The non-transitory computer-readable storage medium of claim 20, wherein the continuous throttling function is a sigmoid function, and wherein the scaling factor value of the sigmoid function is determined dynamically for the shared resource based at least in part upon one or more current conditions.

22. The non-transitory computer-readable storage medium of claim 20, wherein the instructions when executed further cause the processor to:

determine the maximum burst rate for the user and the type of resource at the current period of time, the maximum burst rate being based at least in part upon the maximum traffic level for a determined allowance over a current period of time; and deny the request if a rate of requests received for the user over a current period of time exceeds the maximum burst rate.

23. The non-transitory computer-readable storage medium of claim 20, wherein the instructions when executed further cause the processor to:

determine an allowance factor for the user according to a selected allowance function, the allowance function utilizing at least one measure of value provided by the user, the allowance factor being used to determine at least one of the allowed number of requests for the user over a given period of time and the allowed rate of requests.

24. The computer-implemented method of claim 4, wherein the rate of requests received from the user is determined utilizing a velocity of requests over a prior period, a number of requests in a given time frame, and a time difference from a last time.

* * * * *